United States Patent Office 3,001,340
Patented Sept. 26, 1961

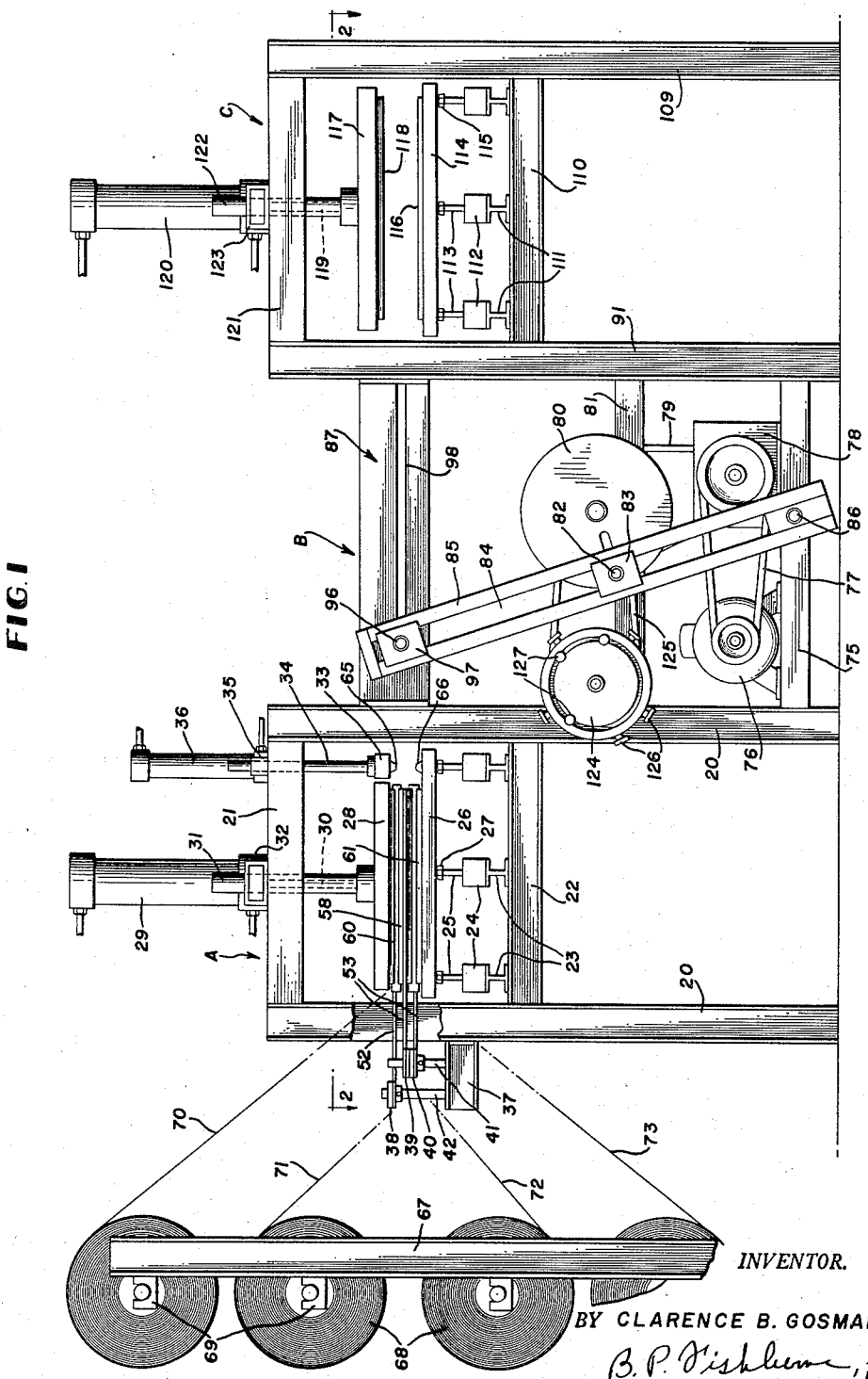

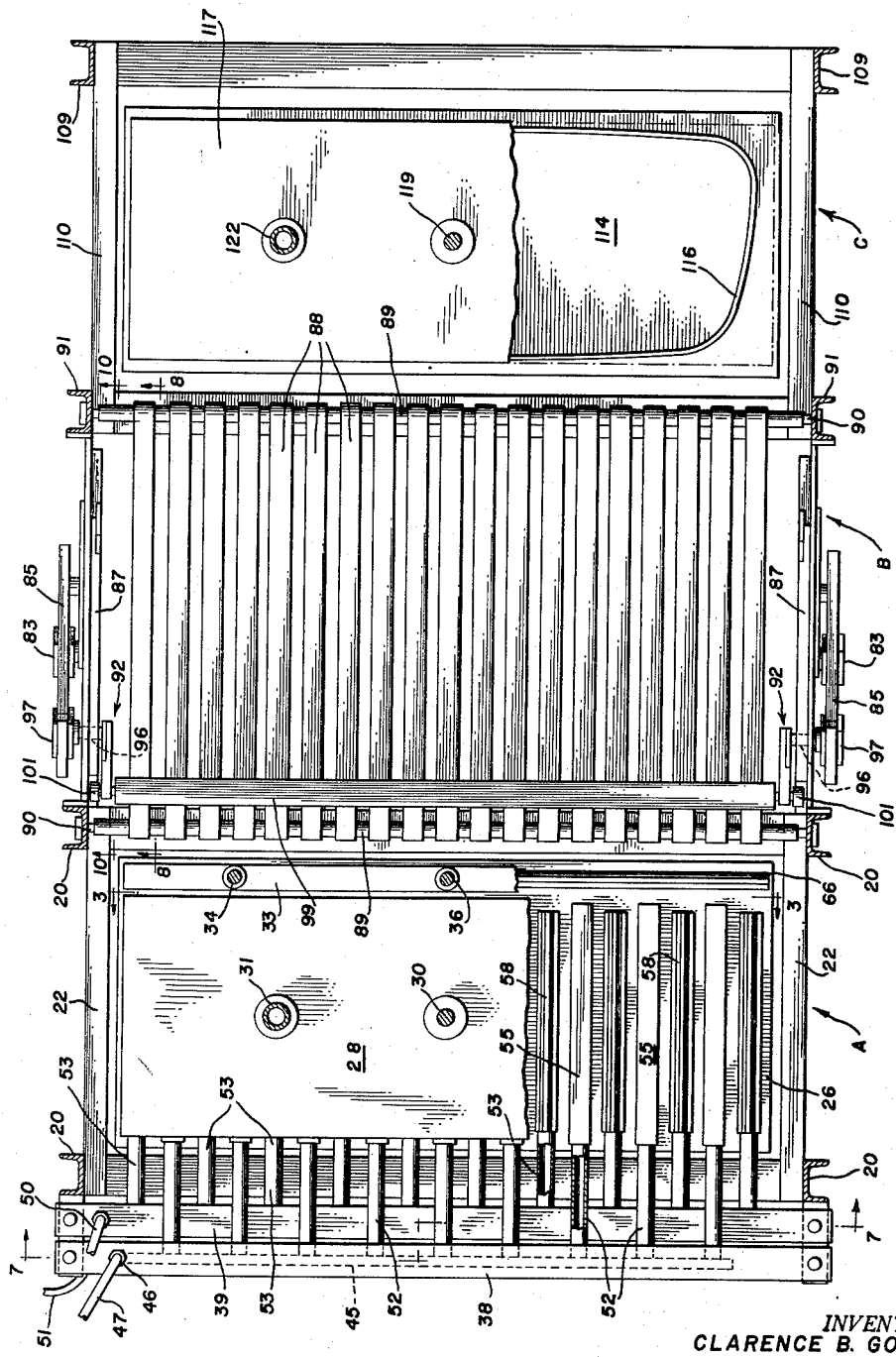

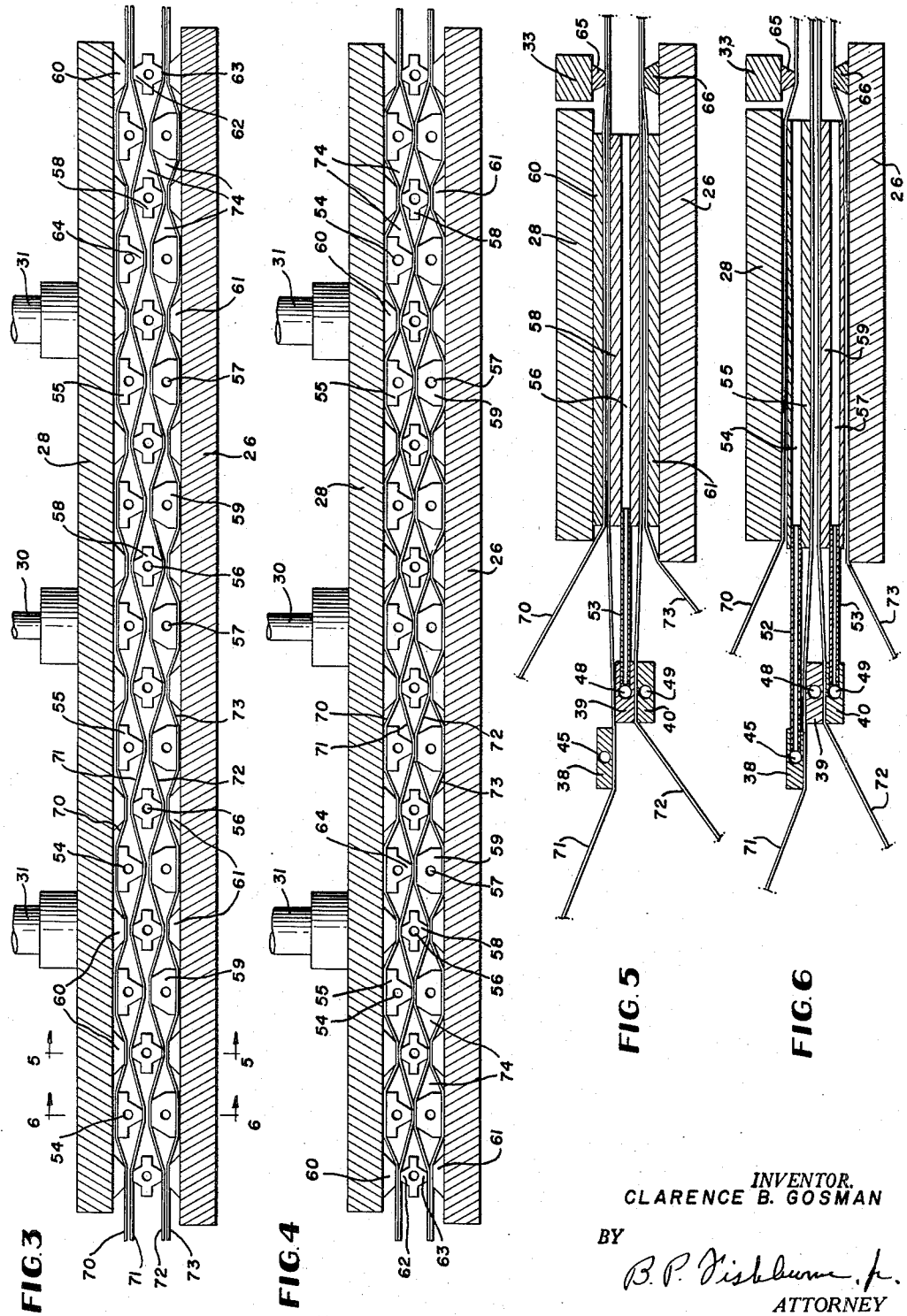

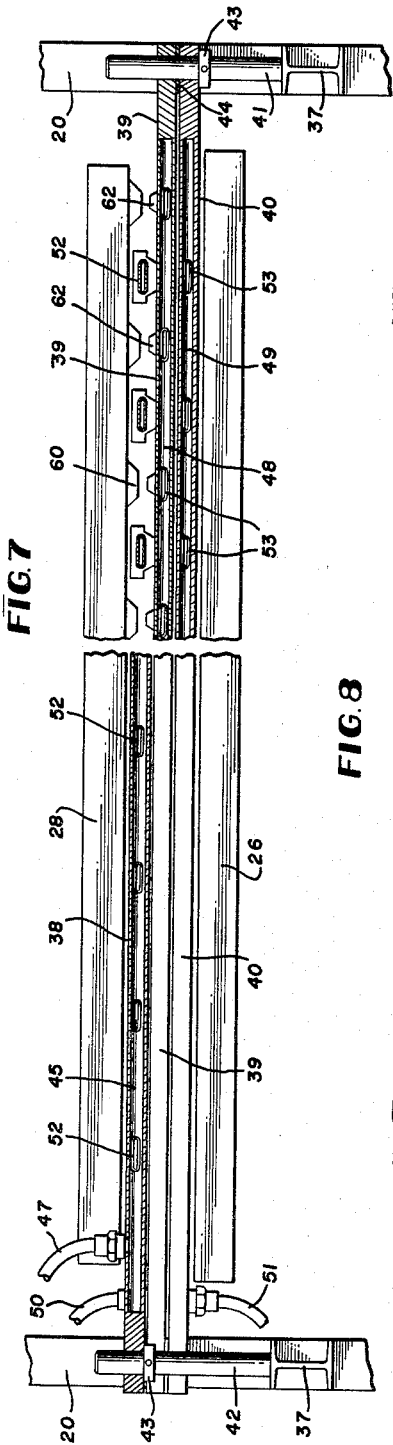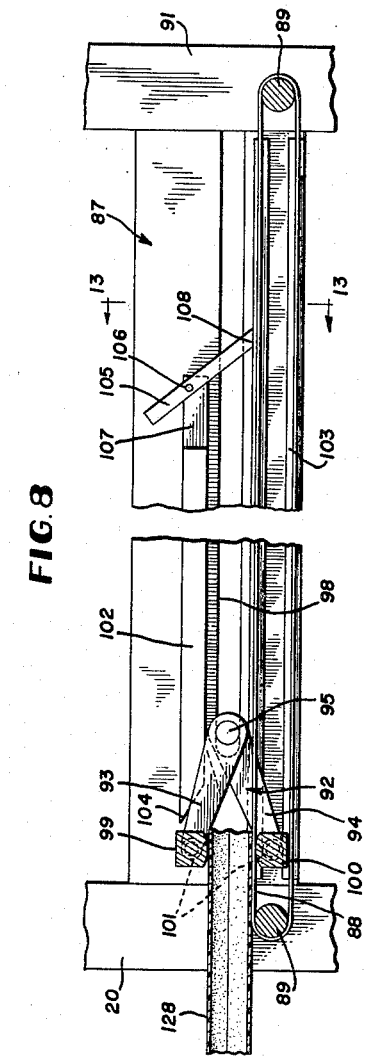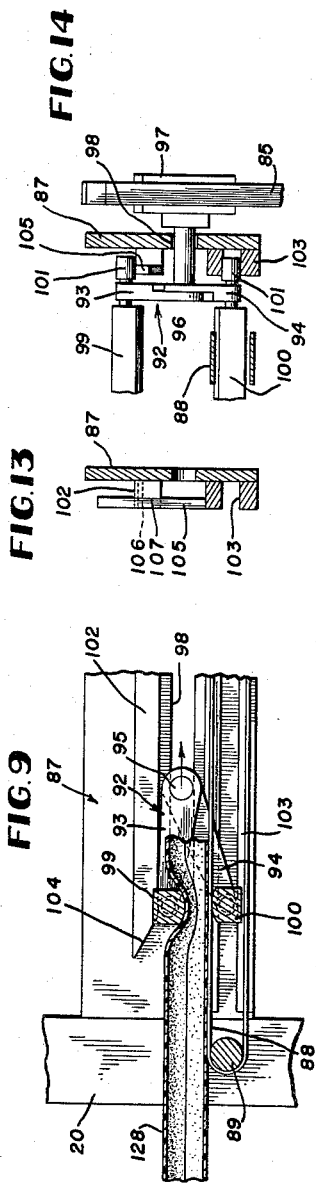
INVENTOR.
CLARENCE B. GOSMAN
ATTORNEY

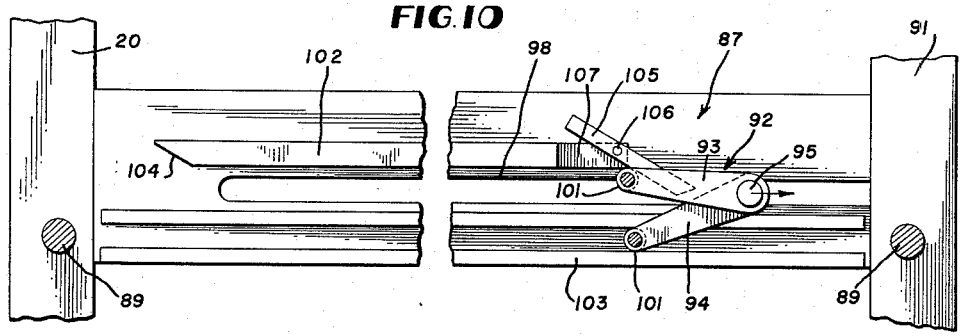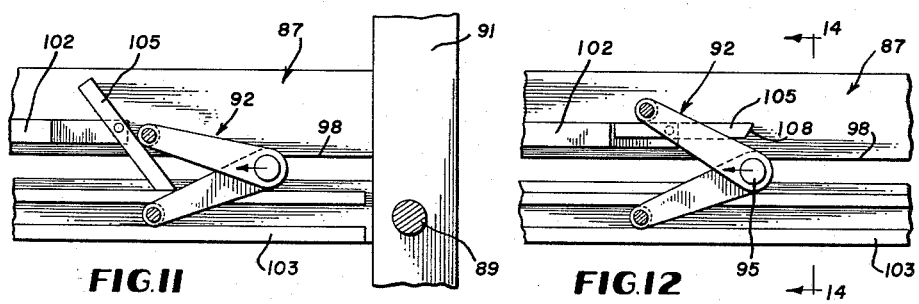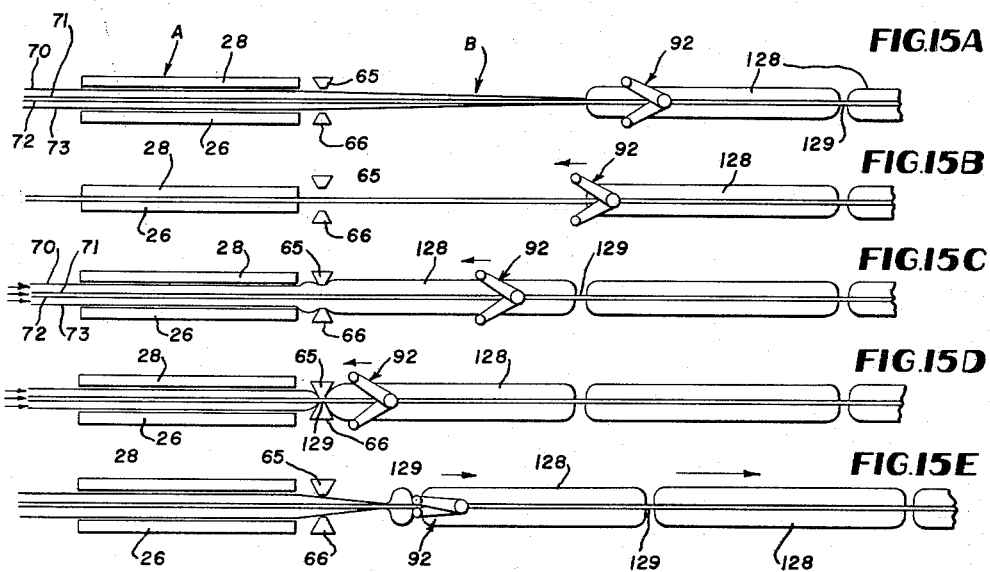

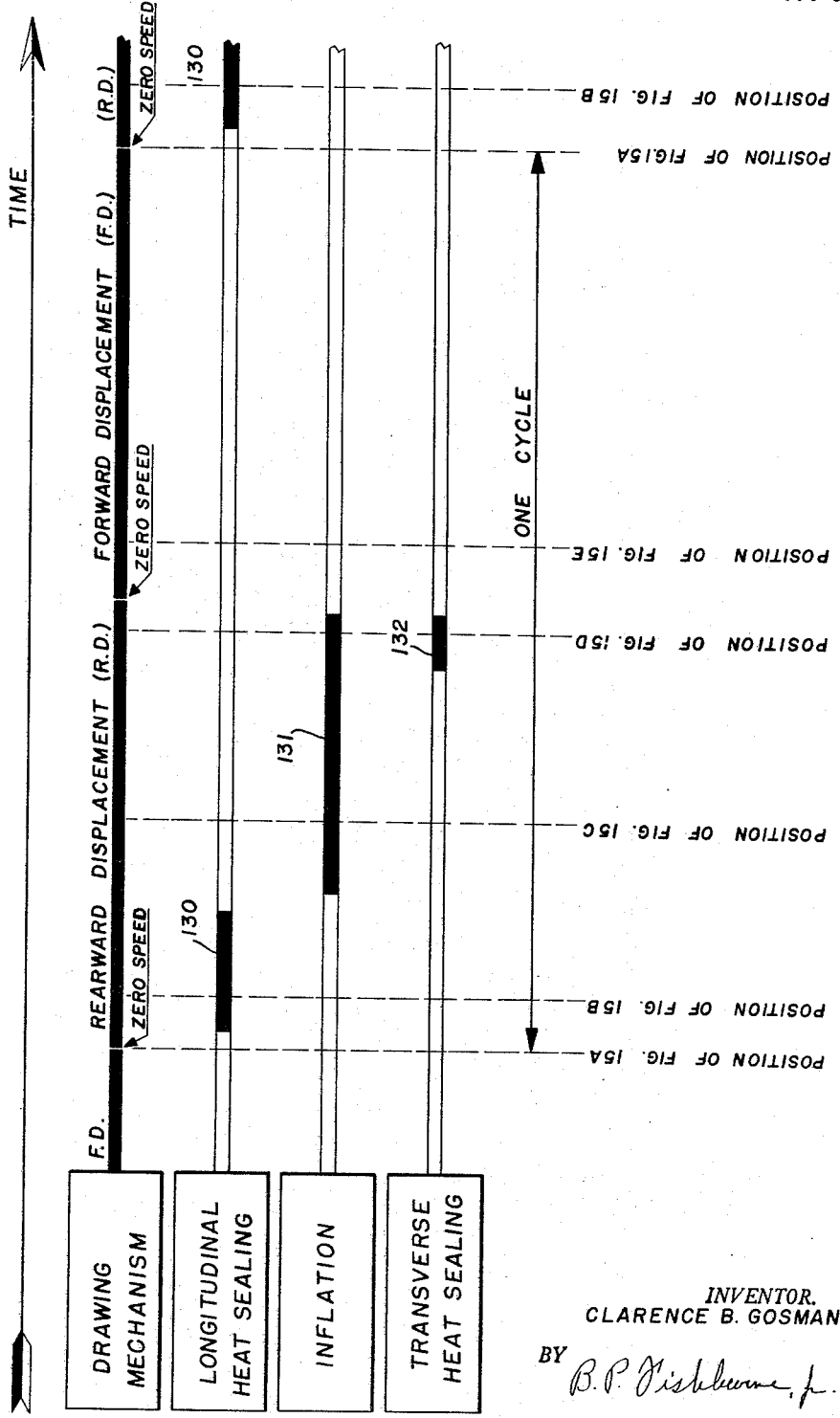

3,001,340
METHOD OF AND APPARATUS FOR MAKING INFLATED ARTICLES
Clarence B. Gosman, Brentwood, N.Y., assignor to Air Pillow & Cushions, Inc., a corporation of New York
Filed Apr. 15, 1960, Ser. No. 22,519
7 Claims. (Cl. 53—28)

This invention relates to a method of and apparatus for making inflated articles such as seat cushions, mattresses, life jackets and the like.

An object of the invention is to provide a method and apparatus for mass producing inflated articles of the mentioned type by a continuous series of steps in an automatic machine, whereby raw material for making the articles is fed into one end of the machine and the completed inflated article, ready for use, is discharged from the other end of the machine.

A further object of the invention is to provide novel and simplified electronic heating or sealing die means in conjunction with novel inflating means to produce inflated articles in a rapid and continuous manner from sheet plastics material fed from rolls.

A further object is to provide in a method and apparatus of the mentioned character forming die means to shape and cut the continuously formed chain of inflated articles into the desired shape so that the articles may serve as seat cushions or the like.

Other objects and advantages of the invention will be apparent during the course of the following description.

In the accompanying drawings forming a part of this application and in which like numerals are employed to designate like parts throughout the same, FIGURE 1 is a side elevation, partly diagrammatic, of apparatus employed in the practice of the method, FIGURE 2 is a horizontal section taken substantially on line 2—2 of FIGURE 1 with parts broken away and parts omitted, FIGURE 3 is an enlarged fragmentary transverse vertical section taken on line 3—3 of FIGURE 2 and showing the heat sealing die means in the inactive condition, FIGURE 4 is a similar view showing the die means of FIGURE 3 in the closed or active condition, FIGURE 5 is a vertical section taken on line 5—5 of FIGURE 3, FIGURE 6 is a similar section taken on line 6—6 of FIGURE 3, FIGURE 7 is an enlarged fragmentary transverse vertical section taken on line 7—7 of FIGURE 2, FIGURE 8 is an enlarged fragmentary longitudinal vertical section taken on line 8—8 of FIGURE 2, FIGURE 9 is a fragmentary section similar to FIGURE 8 and showing work gripping and feeding means of FIGURE 8 in an active condition, FIGURE 10 is an enlarged fragmentary longitudinal vertical section taken on line 10—10 of FIGURE 2, FIGURE 11 is a fragmentary section similar to FIGURE 10 and showing feeding means of FIGURE 10 operating in a reverse direction, FIGURE 12 is a view similar to FIGURE 11 showing a still further operative position of the feeding means, FIGURE 13 is a fragmentary vertical section taken on line 13—13 of FIGURE 8, FIGURE 14 is a similar section taken on line 14—14 of FIGURE 12, FIGURES 15a through 15e are diagrammatic side elevational views illustrating the several major steps of the method in order, FIGURE 16 is a time chart or diagram illustrating the method in function of time for the various method steps in conjunction with the positions of the apparatus elements shown in FIGURES 15a through 15e.

In the drawings, wherein for the purpose of illustration is shown a preferred embodiment of the invention, attention is directed first to FIGURES 1 and 2 which show the apparatus generally. The apparatus embodies broadly a heat sealing and inflating station A, a work feeding or drawing station B and a final work shaping and trimming station C, FIGURES 1 and 2.

At the heat sealing and inflating station A, the apparatus comprises a rigid frame including leg members 20, rigidly connected at their tops with a horizontal support plate 21. Near the vertical centers of the legs 20, the same are further rigidly connected by horizontal frame or support means 22, having transverse horizontal beams 23 rigidly mounted thereon. Insulating members 24, rigid with the beams 23, carry upstanding support posts or pins 25, in turn rigidly secured at their tops to a bottom relatively stationary press plate 26, preferably adjustable vertically upon the posts 25, as at 27. The press plate 26 is stationary during the operation of the apparatus and forms a part of the negative electronic die means to be described.

An upper vertically movable press plate 28 is provided above the press plate 26 and in opposition thereto, and the upper press plate also constitutes a part of the electronic die means. The upper press plate 28 is raised and lowered by a single centrally located upstanding fluid pressure operated ram 29, rigidly mounted upon the plate 21 and having a vertically reciprocatory piston rod 30 connected with the movable press plate 28 to raise and lower the same. The press plate 28 carries rigid upstanding guide elements 31, spaced upon opposite sides of the ram 29, and operating through guide openings in the upper plate 21 and a transverse member or beam 32, rigidly mounted upon the plate 21.

As may be observed in FIGURES 1 and 2, the press plates 26 and 28 substantially span the apparatus transversely, but the upper press plate 28 is somewhat shorter than the lower plate 26, longitudinally of the apparatus. Adjacent the discharge end of the upper press plate 28 and above the corresponding end portion of the press plate 26, there is provided a transverse heat sealing bar or plate portion 33, having upstanding guide means 34 rigid therewith and having guided engagement with the framework of the apparatus at 35. A separate fluid pressure operated ram 36 for the bar 33 is rigidly mounted upon the plate 21 and has a vertically reciprocating piston rod connected with the bar 33 to raise and lower the same independently of the upper press plate 28.

Short extension arms 37 on the inlet side of the framework at the station A, near and above the beams 23, carry transversely elongated horizontal electronic die holders or bars 38, 39 and 40. The die bars 39 and 40 are electrically positive and are supported at their ends by upstanding insulating posts 41, rigid with frame extensions 37. The die bar 38 is electrically negative and is supported at its ends by metal posts 42, rigid with the extensions 37 and grounded through the frame of the apparatus. The respective die bars 38, 39 and 40 have openings formed therethrough near their ends as best shown in FIGURE 7 to receive the posts 41 and 42, and fixed collars 43 on the posts 41 and 42 support the die bars or holders. The die bar 39 is disposed directly above the die bar 40 and is spaced slightly therefrom by an insulating spacer 44, FIGURE 7. The die bars 38, 39 and 40 are rigid and they span the apparatus transversely as shown in FIGURE 2 and are supported at their ends only by the extensions 37 and posts 41 and 42.

With continued reference to the drawings, the transverse die bar 38 has an internal longitudinal bore 45 adapted to receive compressed air at one end through a fitting 46 and hose 47, leading to a source of compressed air, not shown. The die bars 39 and 40 are similarly provided with longitudinal bores 48 and 49, adapted to receive compressed air through hoses 50 and 51. The bores 45, 48 and 49 extend throughout the major portions of the lengths of the die bars 38, 39 and 40 and are closed at their opposite ends, as indicated in FIGURE 7. Each of the die bars 38, 39 and 40 thus also constitutes a compressed air manifold in the apparatus.

Longitudinally extending horizontal preferably metallic tubes 52 and 53 are connected in the forward sides of the die bars 38 and 39 and 40, as shown, and these tubes communicate directly with the manifold bores 45, 48 and 49. The tubes 52 and 53 are flattened transversely as shown in FIGURE 7 and are quite stiff laterally but resilient or somewhat bendable vertically. The tubes 52 and 53 project forwardly in the apparatus, FIGURES 2, 5 and 6, so as to pass between the press plates 26 and 28, and the tubes terminate near the entrance ends of the press plates as shown in FIGURES 5 and 6. The tubes 52 have their forward ends secured within longitudinal bores 54 of elongated longitudinal negative heat sealing dies 55, which extend between the press plates 26 and 28 for substantially the full lengths of the latter. The tubes 53 leading from the die bars 39 and 40 have their forward ends similarly secured within bores 56 and 57, formed through elongated longitudinal heat sealing positive electronic dies 58 and 59, which likewise extend between the press plates 26 and 28, FIGURES 5 and 6. The bores 54, 56 and 57 of the electronic dies are thus in communication with the manifold bores 45, 48 and 49 through the respective tubes 52 and 53, and these metallic tubes are firmly secured to the electronic dies and support the dies against lateral displacement and somewhat against the action of gravity.

The bores 54, 56 and 57 extend entirely through the respective dies 55, 58 and 59, as shown. With particular reference to FIGURES 3 and 4, the electronic dies 55, 58 and 59 are disposed floatingly between the press plates 26 and 28 and are partially supported by the resilient tubes 52 and 53. As stated, the tubes prevent the dies from shifting laterally and this is aided by the flattened configuration of the tubes 52 and 53. The dies 55, 58 and 59 are free to have limited vertical movement between the press plates 26 and 28, due to the vertical resiliency of the flattened tubes, as should be obvious.

With continued reference to FIGURES 3 and 4, the dies 55 are arranged in direct opposition to the dies 59 and a plurality of mating pairs of the dies 55 and 59 are provided between the press plates 26 and 28, across substantially the full widths of the latter. The dies 58 are staggered or arranged alternately between the opposed pairs of dies 55 and 59, for substantially the entire widths of the press plates 26 and 28. A pair of the dies 58 are disposed at the opposite sides of the die apparatus, FIGURES 3 and 4.

Coacting die parts 60 and 61 are arranged above and below each die 58, FIGURES 3 and 4, and longitudinally coextensive therewith and rigidly secured to the press plates 28 and 26 respectively. As shown in the drawings, the dies 58 have upper and lower tapered extremities 62 and 63, providing upon the top and bottom of each die 58 an elongated narrow die face for direct engagement with the opposed flat faces of the die parts 60 and 61 during the heat sealing or welding operation to be described. The upper dies 55 also have depending tapered parts 64, providing narrow elongated die faces for engagement with the flat faces of the lower dies 59.

As shown clearly in FIGURES 5 and 6, the transverse heat sealing bar 33 has a tapered depending die part 65 secured to its lower face and extending substantially throughout its length in opposed relation to a companion transverse die part 66, rigidly secured to the lower press plate 26 near the discharge end of the same.

The die parts 65 and 66 are operable to seal each inflated article transversely at its ends, as will be evident.

At the inlet end of the apparatus, FIGURE 1, suitable support means 67 for a plurality of vertically spaced rolls 68 of heat sealable plastics sheet material is provided, and the rolls are journaled upon the support means at 69 for free rotation. The flexible sheet plastics material on the rolls 68 is of a well-known type adapted to be heat sealed or welded in assembly by the described high frequency die means in FIGURES 3 through 6. This die means operates in a well-known manner, as disclosed in the United States Patent 2,631,646.

As shown in FIGURE 1 and FIGURES 3 through 6, the thin flexible air impervious plastics sheets 70, 71, 72 and 73 from the rolls 68 are adapted to enter between the press plates 26 and 28 and between the dies intermediate these plates in the manner shown in the drawings. The upper sheet 70 passes directly under the press plate 28 and under the die elements 60 carried thereby. The sheet 70 also passes over the tops of the dies 55 as shown. The sheet 71 first passes under the die bar 38 and then under the dies 55 and over the tops of the dies 58, between the plates 26 and 28. The sheet 72 passes between the die bars 39 and 40, separated by spacers 44, and over the tops of the dies 59 and under the dies 58 as best shown in FIGURES 3 and 4. The lowermost sheet 73 passes over the stationary press plate 26 and its die elements 61 and beneath the dies 59, as shown.

As best shown in FIGURES 3 and 4, the described passage of the sheets 70, 71, 72 and 73 through the die structure between the plates 26 and 28 forms the sheets into a honeycomb-like sandwich structure having a plurality of elongated longitudinal compartments 74 which are non-communicating and air tight after the welding or heat sealing operations. The pockets or compartments 74 extend lengthwise of the direction of feed of the plastic sheets through the apparatus.

At station B of the apparatus, means are provided to draw or pull the work through the die structure of station A during the practice of the method. Such means comprises a horizontal rigid frame member 75 near the bottom of the frame structure, supporting an electric drive motor 76, connected by gearing 77 with a suitable speed reducer 78, likewise rigidly mounted upon the member 75. The output shaft of the speed reducer 78 is connected through gearing 79 with a rotary disc 80, mounted for rotation upon an elevated horizontal frame member 81 of the frame structure. The disc 80 has an eccentric crank 82, pivoted to a block 83, slidable within a guide slot 84 in an oscillating arm 85, having its lower end pivoted at 86 to the member 75. A pair of the arms 85 and associated elements are mounted upon opposite sides of the apparatus, as shown in FIGURE 2, and the arms 85 are operated in unison so as to swing vertically about their pivots 86 under influence of the rotary disc 80.

A horizontal conveyor frame 87 is rigidly mounted upon the framework of the apparatus near the elevation of the die means and press plates 26 and 28, to receive the inflated articles as they are formed by the inflating die means. The conveyor means comprises a horizontal endless conveyor belt bed having a plurality of spaced flexible belts 88, engaging about a pair of parallel transverse unpowered rolls 89, having their ends journaled for rotation as at 90 upon the legs 20 and similar legs 91 of the apparatus frame.

Scissor mechanisms 92 on opposite sides of the conveyor frame 87 include upper and lower vertically swingable arms 93 and 94, pivotally connected at 95 by a short shaft 96, having its outer end pivoted to a block 97, slidable within the guide slot 84 of adjacent arm 85. This construction is identical on opposite sides of the conveyor structure of station B. The shafts 96 are slidable horizontally through guide slots 98 in the frame sides 87. Transverse horizontal elongated clamp bars 99 and 100 are pivotally secured to the arms 93 and 94 of the scissor units 92 and extend transversely of the apparatus as shown in FIGURE 2. The upper clamp bar 99 is spaced above the upper runs of the conveyor belts 88, while the lower clamp bar 100 rides between the upper and lower runs of the conveyor belts, as shown clearly in FIGURE 8, and in FIGURES 9 and 14. The ends of the clamp bars 99 and 100 may have rollers 101, FIGURE 14, for guided engagement with horizontal longitudinal track members 102 and 103, rigidly secured to the inner faces of conveyor frame sides 87.

It may now be seen that oscillation of the arms 85 upon their pivots 86 will cause the scissor units 92 with clamp bars 99 and 100 to traverse the conveyor section of the apparatus longitudinally in the forward and rearward direction, as the disc 80 rotates, to draw the chain of inflatable articles produced by the die means through the apparatus step-by-step. The rollers 101 of the lower clamp bar 100 ride continuously in the horizontal slot of each lower track 103, whereas the rollers 101 of the upper clamp bar 99 are adapted to pass below and above the upper tracks 102. The rear ends of tracks 102 are beveled at 104 so that the rollers 101 of bar 99 will be cammed downwardly toward the bottom faces of the tracks 102 when the arms 85 swing forwardly or to the right in FIGURE 1. This will shift the upper clamp bar 99 downwardly to grip the inflatable article between the bar 99 and the upper runs of the belts 88, which have the lower clamp bar 100 constantly beneath them. As the scissor units 92 are thus drawn forwardly or to the right, FIGURE 9, the inflated articles will be drawn forwardly with the upper runs of the belts 88, due to the clamping action afforded by the bars 99 and 100.

When the scissor units 92 and arms 85 reach the forward end of their travel as in FIGURE 10, and begin to return rearwardly toward the welding station A as in FIGURE 11, the scissor units are beyond the upper tracks 102, which are somewhat shorter than the lower tracks 103. Trip dogs 105 are pivoted at 106 to the forward ends of tracks 102 and the dogs 105 are mounted within recesses 107 of the tracks 102. The dogs 105 remain normally inclined as in FIGURE 8 due to gravity, with their lower beveled ends 108 engaging upon the tops of tracks 103, see FIGURE 13. As illustrated in FIGURES 10 through 12, the rollers 101 of upper bar 99 are adapted to pass under the trip dogs, FIGURE 10, as the arms 85 approach their forwardmost positions, and the trip dogs pivot upwardly to permit the rollers 101 to pass under and clear the same, after which the trip dogs 105 return to their normal inclined positions as in FIGURES 8 and 11. When the arms 85 begin their back stroke toward the welding station A, FIGURE 11, the rollers 101 travel up the inclined dogs 105 and the rollers are thus guided onto the tops of the horizontal tracks 102 where they remain during the back stroke of the arms 85. This action elevates the upper clamp bar 99 so that the same does not grip the inflated articles during the back or return stroke of the arms 85 and scissor units 92. Upon reaching the limit of the back stroke of arms 85, the rollers 101 pass from the tops of tracks 102 and the clamp bar 99 again drops upon the inflated article, and upon the next forward stroke of the arms 85, FIGURE 9, the rollers 101 of bar 99 will be forced downwardly to the lower sides of tracks 102 by the beveled faces 104.

Thus, the mechanism at station B of the apparatus serves continuously to draw the finished work from the heat sealing or welding station A forwardly in the apparatus in a step-by-step manner.

At station C of the apparatus, means are provided to impart a final finished shape to each inflated article and to sever each article from the continuous chain of articles of regular shape produced at station A and fed forwardly, one article at a time, at station B. Such means comprises an additional pair of frame legs 109 and an elevated horizontal frame part 110, rigidly secured to the legs 91 and 109. Spaced transverse beams 111 are rigidly mounted upon the frame part 110 and carry insulating members 112, rigid therewith, and in turn carrying rigid upstanding pins 113 having a horizontal stationary die plate 114 mounted thereon and being somewhat adjustable vertically at 115. The die plate 114 has an upstanding contoured die element or rib 116 formed thereon of a desired shape to form each inflated article in succession into the proper shape for a boat seat cushion or the like by a combined heat sealing and severing operation. A coacting vertically movable upper die plate 117 having a depending contoured die element or rib 118, identical in shape to the die element 116 is provided, and the upper plate 117 is carried by a vertical reciprocatory piston rod 119, operated by an upstanding fluid pressure operated ram 120, rigidly mounted upon a top horizontal frame member 121 of the apparatus. The upper die plate 117 is guided during reciprocation toward and from the stationary plate 114 by a pair of upstanding guide bars 122, rigid therewith, on opposite sides of the ram 120 and having guided engagement within openings in the member 121 and a top transverse bar 123, rigidly mounted upon the member 121. The arrangement is substantially the same as that previously described in connection with the press plate 28 at station A.

The disc 80 operates a rotary control disc 124 through suitable gearing 125, and the control disc turning at slow speed carries a plurality of circumferentially spaced radial and side projections 126 and 127, adapted to engage and operate suitable electric switches, not shown, for controlling the operation of the various apparatus components in properly timed sequence. The control circuitry for the apparatus may be entirely conventional and need not be shown or described in this application.

The operation of the apparatus in the practice of the method is briefly as follows:

The leading ends of the plastics sheets 70, 71, 72 and 73 are initially placed through the die mechanism at station A in the manner previously described in connection with FIGURES 3–6, and the free ends of the sheets may be drawn somewhat beyond station A and forwardly of the clamp bars 99 and 100 when the latter are positioned as in FIGURES 2 and 8.

With reference to the drawings in general and diagrammatic FIGURES 15a–15e in particular, let it be assumed that the apparatus has been operating normally to produce inflated cushion bodies 128 in an endless chain.

In FIGURE 15a, the press plate 28 is separated from the stationary press plate 26, corresponding to the showing in FIGURE 3, and the die bar 33 is likewise separated from the transverse die element 66 on the plate 26. The arms 85 have reached the end of their forward stroke, and the scissor units 92 have opened up due to engagement of the upper rollers 101 with the dogs 105 in the manner shown in FIGURES 11 and 12. The heat sealed inflated bodies 128 shown in FIGURE 15a have just been pulled forwardly by the clamp bars 99 and 100 and the arms 85 and associated parts are about to begin their back stroke toward the heat sealing station A. No inflating air from the manifold bores 45, 48 and 49 and the tubes 52 and 53 is, at this time, entering the dies 55, 58 and 59 between the plastics sheets 70, 71, 72 and 73 at the heat sealing station A.

With reference to FIGURE 15b, while the arms 85 and scissor units 92 are moving toward the station A and the work is stationary, the upper press plate 28 moves downwardly by actuation of the ram 29 to close or activate the die mechanism as illustrated in FIGURE 4, and at this time, the transverse bar 33 with die element 65 remains elevated, FIGURE 15b. When this occurs, the four sheets 70–73 are all simultaneously heat sealed or welded along a plurality of spaced parallel longitudinal seams for the full lengths of the dies, and at the narrow regions where the tapered die parts 62 and 63 meet the die elements 60 and 61 and where the tapered die parts 64 meet the tops of the dies 59, FIGURE 4. This effectively closes or seals the multiplicity of longitudinal compartments 74 of the work and also closes or seals the work near the opposite longitudinal edges thereof as should be clearly obvious from an inspection of FIGURE 4.

With reference to FIGURE 15c, the arm 85 and the inactive scissor units 92 are continuing on their back stroke, the transverse sealing die 65 is still elevated from the die 66 and the upper press plate 28 is now retracted upwardly to open the die structure at station A so that the dies once again assume their relative positions shown in FIGURE 3 with respect to the plastics sheets. In FIGURE 15c, the compressed air from the manifold bores 45, 48 and 49 has now begun to enter the bores 54, 56 and 57 of the dies through the tubes 52 and 53, and inflating air enters the compartments 74 of the work to inflate the same to the desired pressure. The portion of the work previously heat sealed at the station A, FIGURE 15b, is now still within the die structure between the press plates 26 and 28, FIGURE 15c, and the next forwardmost work unit or body 128 which has had its forward transverse end closed by heat sealing at 129 by the transverse dies 65 and 66, during the previous cycle of operation of the apparatus, retains the inflating air within the compartments 74 of the work unit 128, immediately in advance of station A, FIGURE 15c.

With reference to FIGURE 15d, when the arms 85 and the open scissor units 92 substantially reach the end of their back stroke, and while the upper press plate 28 is still elevated, and the longitudinal heat sealing die structure is open, FIGURE 3, and while inflating air is still entering the work as shown by the arrows in FIGURES 15c and 15d, the upper die bar 33 with transverse sealing die element 65 is shifted downwardly by the ram 36 to close the die elements 65 and 66, FIGURE 15d. This operation heat seals or welds the four sheets 70–73 transversely across the entire width of the work at 129, FIGURE 15d, and this permanently closes the rear ends of the multiple compartments 74 of the inflated work unit 128 immediately in advance of station A, and also closes the forward ends of the compartments 74 in the work unit which is still positioned between the plates 26 and 28 at station A, FIGURE 15d.

With reference to FIGURE 15e, the arms 85 and scissor units 92 have now begun their next forward stroke and the scissor units 92 are rendered active or closed by engagement of the upper rollers 101 with beveled track faces 104, FIGURES 8 and 9, and the arms 85 and associated elements are now beginning to draw the work once more through the apparatus in the direction of the arrows by gripping engagement of the bars 99 and 100 with the rear portion of the work unit 128 which has just had its rear end closed in FIGURE 15d by the die elements 65 and 66. In FIGURE 15e, the die element 65 has again been retracted upwardly and separated from the lower die element 66, and the die structure at station A remains open and the inflating air from the manifold bores 45, 48 and 49 is now shut off by automatic valve means, not shown, controlled by the rotary control disc 124. The arms 85 and associated elements now continue to draw the work forwardly in the apparatus until the arms and scissor units 92 reach the forward end of their travel and the scissor units are again opened at the beginning of the back stroke of the arms 85 by the dogs 105. At this time, the apparatus will again be in the condition shown in FIGURE 15a and the cycle of operation is repeated continuously for the desired time to continuously produce the inflated bodies 128 in an endless chain.

Each inflated body 128 is heat sealed longitudinally and transversely at its sides and ends and the several inflated compartments 74 are sealed at their longitudinal sides so that the compartments are permanently inflated and completely non-communicating. Each unit 128 thus embodies a multiplicity of elongated longitudinally extending honeycomb-like inflated compartments in staggered relation, as shown generally in FIGURE 4 before inflation.

If desired, the finished work thus described may be taken at the discharge end of station B and severed transversely at the middle of each transverse seal 129 to separate the inflated bodies 128 so that the same may be utilized as cushions or the like in the rectangular shape produced at station A.

However, if it is desired to impart to each permanently inflated unit 128 a particular shape for a particular use, then the shaping and severing high frequency die means of station C is employed in connection with each work unit 28 in the endless chain of work units being fed through the apparatus at station B. That is to say, when each unit 28 is between the die plates 114 and 117 and at rest, the die plate 117 is shifted downwardly toward the plate 114 by the ram 120 and the contoured die ribs 116 and 118 engage the inflated body 128 near its margins to heat seal and sever the same and impart thereto a marginal shape conforming to the shapes of the die ribs 116 and 118, and which shapes may be varied in the apparatus to meet specific needs. When the apparatus at station C is to be employed, a lesser amount of inflating air is initially introduced into each body 128 because the subsequent shaping and sealing operation at station C will tend to increase the degree of inflation within each body 28 due to squeezing of such body by the die means 114 and 117. In general, the bodies may be inflated by the apparatus to any desired pressure.

In FIGURE 16, there is shown a chart in function of time, and illustrating diagrammatically one complete cycle of operation of the apparatus during the practice of the method. The chart illustrates by the filled in stripes the amount of time during which the various parts of the apparatus are active during a complete cycle of operation, and also at which points or periods during a cycle of operation the various apparatus components are rendered active and inactive.

Thus, with reference to FIGURE 16, the drawing mechanism including arms 85 and associated elements are active forwardly or rearwardly during the cycle of operation all of the time. The longitudinal heat sealing die means at station A, FIGURES 3 and 4, are active during the period of time indicated at 130, toward the beginning of the cycle. The inflating means is active during the time period indicated at 131, and the transverse heat sealing means 65 and 66 is only active during the short time interval indicated at 132. FIGURE 16a also shows the cycle of operation in terms of the positions of the apparatus in FIGURES 15a through 15e during one complete cycle.

It is to be understood that the form of the invention herewith shown and described is to be taken as a preferred example of the same, and that various changes in the shape, size and arrangement of parts, and various changes in the order or sequence of method steps, may be resorted to, wtihout departing from the spirit of the invention or scope of the subjoined claims.

Having thus described my invention, I claim:

1. A method of producing air inflated bodies comprising the steps of feeding more than a pair of sheets of air imperious heat sealable material into superposed relation, engaging the superposed sheets between opposed faces thereof and along laterally spaced and vertically staggered lines to support the sheets in partially separated relation and to form them into a plurality of long lognitudinal honeycomb-like interfitting separate tubular compartments, heat sealing the sheets along said engaging lines to permanently connect the sheets and render said long tubular compartments laterally non-communicating throughout their entire lengths, inflating said tubular compartments with air while engaging the sheets along said lines and heat sealing the sheets transversely at corresponding ends of the tubular compartments to permanently close such ends while continuing to maintain the compartments inflated, and then feeding the sheets longitudinally so that additional areas of the sheets are brought into superposed relation preparatory to repeating the cycle of operation.

2. A method of producing air inflated bodies in a continuous chain comprising feeding a multiplicity of air impervious heat sealable plastics sheets longitudinally from supply rolls into superposed relation, engaging the superposed sheets between the opposed faces thereof along laterally spaced vertically staggered lines to support the sheets in partially separated relation and to form them into a multiplicity of long interfitting honeycomb-like separate tubular compartments which are generally diamond-shaped in cross section prior to being inflated, heat sealing said sheets along said engaging lines to permanently connect them and render said compartments non-communicating throughout their lengths, inflating said tubular compartments with air after said heat sealing and while continuing to engage said sheets along said lines, and heat sealing the sheets along a line transversely thereof while continuing to inflate said compartments and near the end of the inflating step of the method to render the compartments closed at corresponding ends thereof, and repeating the cycle of operation.

3. A method of producing air inflated bodies in a continuous chain according to claim 2, and heat sealing said sheets adjacent each inflated body along a contoured marginal line to impart to each body a desired marginal shape and to sever each body from the chain of inflated bodies cleanly.

4. Apparatus for producing inflated bodies comprising a stationary press plate having spaced parallel longitudinal high frequency heat sealing die elements upon its upper face, a reciprocatory press plate movable toward and from said stationary press plate and having spaced parallel longitudinal high frequency heat sealing die elements upon its lower face in opposition to the die elements of the stationary press plate, spaced parallel longitudinal high frequency heat sealing die elements arranged between and in opposition to the die elements of said press plates, upper and lower spaced parallel longitudinal high frequency heat sealing die elements arranged between said press plates and disposed intermediate the first and second named die elements, the second and last-named die elements having longitudinal bores formed therethrough, resilient tubes connected in corresponding ends of said bores of the second and last-named die elements, transverse manifolds for compressed air connected with and supporting said tubes so that the latter may floatingly support the second and last-named die elements between said press plates, a transverse sealing die element on said stationary press plate near corresponding ends of said longitudinal die elements, an upper reciprocatory transverse die element arranged in opposition to said transverse die element of the press plate and movable toward and from the same independently of the reciprocatory press plate, means to reciprocate the reciprocatory press plate and transverse die element independently, and means to draw a plurality of heat sealable air impervious flexible sheets between said press plates longitudinally and around said longitudinal die elements so that the latter form the sheets into a multiplicity of interfitting longitudinal tubular non-communicating compartments.

5. Apparatus for producing air inflated bodies in a continuous chain comprising means for supporting more than two rolls of air impervious heat sealable flexible sheet material, continuously operable reciprocatory gripper feed means engageable with the sheet material carried by said rolls to draw such material forwardly step-by-step in superposed parallel relation, longitudinally extending resiliently supported heat sealing die and air inflating means interposed between said supporting means for said rolls and said gripper feed means and including a multiplicity of parallel elongated tubular die elements arranged in laterally spaced relation and staggered normal to the planes of said sheet material and engageable with opposite faces of the sheet material when the latter is drawn by the feed means through said die and inflating means to thereby form the superposed sheet material into a multiplicity of longitudinally extending honeycomb-like separate compartments, means to reciprocate the die and inflating means normal to the planes of said sheet material to effect the heat sealing of the sheet material at the longitudinal sides of said compartments, means for introducing inflating air into said compartments through said tubular die elements subsequent to the heat sealing of the sheet material, and transverse heat sealing die means separate from said die and inflating means and operable independently thereof to heat seal said sheet material transversely for closing corresponding ends of said compartments when the compartments are inflated.

6. Apparatus for producing inflated bodies in series comprising upper and lower relatively movable high frequency heat sealing die means and intermediate high frequency heat sealing die means disposed between said upper and lower die means, second upper and lower heat sealing high frequency die means spaced laterally from the first-named upper and lower and said intermediate die means, said intermediate and second upper and lower die means having longitudinal bores formed therethrough, compressed air manifolds extending transversely of said die means near one end thereof, resilient tubes connected with said manifolds and secured to the intermediate and second upper and lower die means and communicating with the bores of the latter, means to reciprocate the first-named upper die means, and means to feed a plurality of superposed heat sealable sheets of plastics material longitudinally through said die means so that the latter may heat seal the sheets along spaced longitudinal lines to form a multiplicity of interfitting non-communicating longitudinal inflated compartments therein.

7. Apparatus for producing inflated bodies from flexible heat sealable air impervious sheet material comprising opposed relatively movable heat sealing die means, intermediate heat sealing die means arranged between the opposed die means for coaction therewith, second opposed heat sealing die means arranged alternately with the first-named opposed and intermediate die means, means to shift the first-named opposed die means toward and from each other, means to pull a plurality of superposed sheets of said material longitudinally through said die means so that adjacent pairs of said sheets pass between the first-named opposed and intermediate die means and other pairs of sheets pass between the second opposed die means and between the latter and the first-named opposed die means, whereby said sheets may be heat sealed by the die means to provide therein a plurality of interfitting elongated tubular non-communicating compartments, and means to inflate said compartments and to close the ends of the compartments after they are formed by said die means.

References Cited in the file of this patent
UNITED STATES PATENTS

| 2,918,768 | Rado | Dec. 29, 1959 |
| 2,940,230 | Flax | June 14, 1960 |